(No Model.)
W. HERNE.
GATE OR GUARD FOR LIFT BRIDGES.
No. 560,501. Patented May 19, 1896.
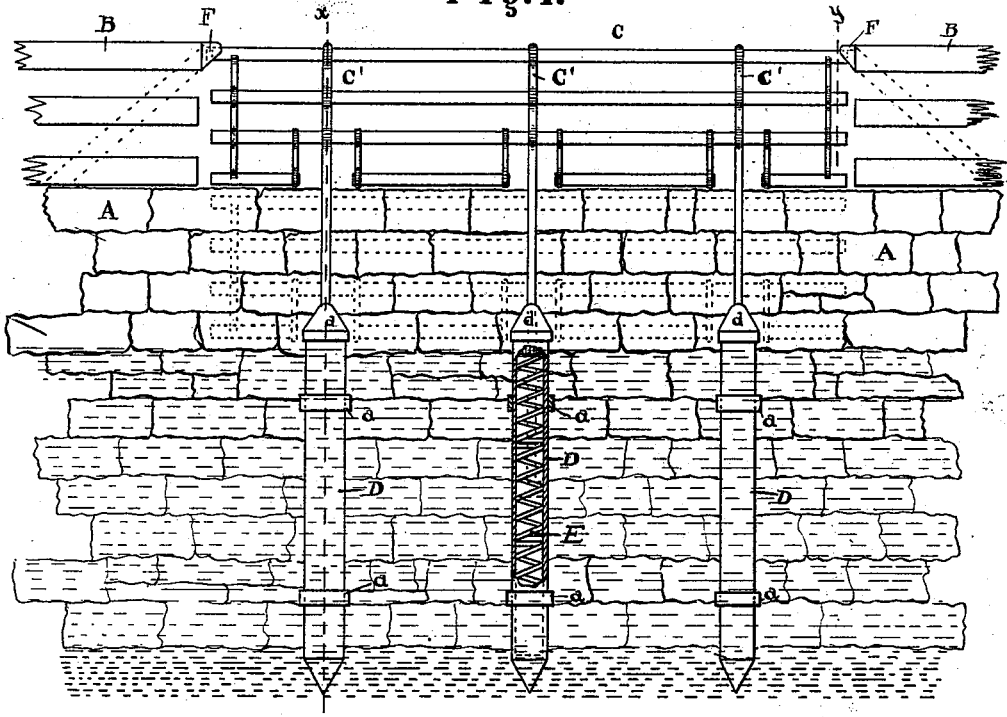
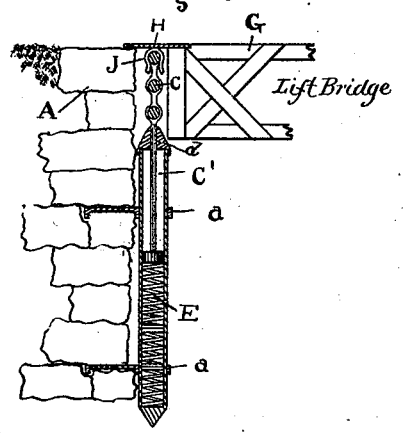
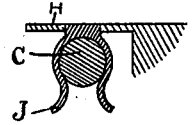
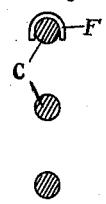
Witnesses.
Inventor.
William Herne

UNITED STATES PATENT OFFICE.

WILLIAM HERNE, OF ROCHESTER, NEW YORK, ASSIGNOR OF ONE-HALF TO JOSEPH H. WALBURN, OF SAME PLACE.

GATE OR GUARD FOR LIFT-BRIDGES.

SPECIFICATION forming part of Letters Patent No. 560,501, dated May 19, 1896.

Application filed March 20, 1896. Serial No. 584,132. (No model.)

*To all whom it may concern:*

Be it known that I, WILLIAM HERNE, of Rochester, in the county of Monroe and State of New York, have invented certain new and useful Improvements in Gates or Guards for Lift-Bridges; and I do hereby declare the following to be a full, clear, and exact description of the same, reference being had to the accompanying drawings, forming a part of this specification, and to the reference-letters marked thereon.

My present invention has for its object to provide an efficient automatic gate or guard for lift-bridges which will effectually guard the roadway and prevent the passage of persons or animals when the bridge is elevated; and it consists in certain improvements hereinafter fully described, the novel features being pointed out in the claims at the end of this specification.

In the drawings, Figure 1 is a view of a gate constructed in accordance with my invention, the bridge being raised and the gate shown closed in full lines and open in dotted lines; Fig. 2, a sectional view on the line $x$ $x$ of Fig. 1, showing the gate open and the bridge down; Fig. 3, a sectional view of the clasps between the bridge and gate; Fig. 4, a section on the line $y$ $y$ of Fig. 1.

Similar reference-letters in the several figures indicate similar parts.

In the present embodiment of my invention I have shown the gate as arranged to guard the entrance to a lift-bridge crossing a canal, A indicating the canal wall or abutment; B, the fence at the side of the canal, of which the gate is to form a continuation, having a space permitting access to the bridge and adapted to be closed by the gate. C indicates the gate, preferably constructed of an iron framework and having the depending standards or supports C' in the form of rods projecting into suitable tubular guides D, composed, preferably, of pipe with sharpened closed lower ends and preferably driven into the ground, said tubes being secured to the wall or other suitable support A by staples $a$ or other attaching means. The upper ends of the tubes D are provided with caps $d$, having apertures forming bearings for the standard C', and within each of the tubes D and beneath the ends of each of said standards are arranged springs E, preferably in detached sections resting upon each other, as shown, but strong enough to raise the gate up to the position shown in full lines in Fig. 1 when the bridge is raised, and to maintain it there, effectually guarding the bridge-entrance.

The ends of the gate are adapted, when the gate is raised, to enter the curved socket-plates F on the fence, projecting inwardly, as shown, thereby forming a smooth surface for the tow-rope to slide over and also serving to steady the gate when raised.

G indicates the platform of the bridge, operating in connection with the gate, and which may be of any suitable construction and moved by any suitable mechanism so long as it is adapted to be raised and lowered. The bridge is provided with an overhanging or projecting ledge H in the form of a plate adapted to cover the top of the gate when the bridge is down, and in order that the bridge in rising may assist in lifting the gate I provide the under side of the overhanging edge H with two or more U-shaped spring-clasps J, serving to engage the top rail of the gate as it is pressed down by the bridge in closing and to assist it when rising, said clasps becoming disengaged automatically when the gate is arrested by the plates F on the fence or barrier B.

It will be understood that when the bridge is closed, or in lowermost position, the gate will be held beneath the roadway by it; but when the bridge is raised the springs E will cause the gate to follow it up to the position in full lines, Fig. 1, (the clasps J assisting it,) the bridge rising higher to permit the passage of a boat.

I contemplate employing one of these gates at each end of the bridge, but deem it only necessary to show one gate herein.

It is not necessary that the fence B should extend any considerable distance on opposite sides of the gate, as it is sufficient if very short and has inclines at the ends for raising the tow-rope up so as to pass over the gate when raised, as shown in dotted lines in Fig. 1.

I claim as my invention—

1. The combination with a lift-bridge, of the gate for guarding the approach thereto having the depending standards, the tubular guides in which the standards operate, and the springs beneath said standards for raising the gate, substantially as described.

2. The combination with the vertically-movable bridge having the projecting ledge at the end, of the vertically-movable gate arranged beneath the bridge, and means for raising it when the bridge is elevated, substantially as described.

3. The combination with the vertically-movable bridge-platform having the clasps on the end, of the vertically-movable gate arranged beneath the end of the bridge and adapted to be engaged by the clasps, and stops for limiting the upward movement of the gate, substantially as described.

4. The combination with the vertically-movable bridge, of the gate having the depending standards, the tubular guides for said standards having the sharpened ends, holding devices for the guides, and the springs in the guides upon which the standards are supported, substantially as described.

WILLIAM HERNE.

Witnesses:
F. F. CHURCH,
G. A. RODA.